US012664691B2

(12) United States Patent　　　　　　(10) Patent No.:　US 12,664,691 B2
Zhu et al.　　　　　　　　　　　　　　(45) Date of Patent:　Jun. 23, 2026

(54) METHOD AND DEVICE FOR CALIBRATING POSITION OF MOVER IN DIRECT DRIVE TRANSMISSION SYSTEM

(71) Applicant: AAC Technologies (Nanjing) Co., Ltd., Nanjing (CN)

(72) Inventors: Xueyuan Zhu, Nanjing (CN); Lin Qian, Nanjing (CN); Weiling Shi, Nanjing (CN); Shun Guo, Nanjing (CN)

(73) Assignee: AAC Technologies (Nanjing) Co., Ltd., Nanjing (CN)

( * ) Notice: Subject to any disclaimer, the term of this patent is extended or adjusted under 35 U.S.C. 154(b) by 396 days.

(21) Appl. No.: 18/331,118

(22) Filed: Jun. 7, 2023

(65) Prior Publication Data

US 2024/0185462 A1　　Jun. 6, 2024

Related U.S. Application Data

(63) Continuation of application No. PCT/CN2023/084478, filed on Mar. 28, 2023.

(30) Foreign Application Priority Data

Dec. 5, 2022　(CN) .......................... 202211547451.8

(51) Int. Cl.
　　*G06K 9/00*　　　(2022.01)
　　*G01B 11/02*　　(2006.01)
　　*G06T 7/73*　　　(2017.01)
　　*G06T 7/80*　　　(2017.01)
(52) U.S. Cl.
　　CPC .............. *G06T 7/85* (2017.01); *G01B 11/026* (2013.01); *G06T 7/73* (2017.01); *G06T 2207/20164* (2013.01)

(58) Field of Classification Search
CPC ..... G06T 1/0014; G06T 1/0007; G06T 7/001; G06T 7/73; G06T 7/85; G06T 2207/20164; G06T 7/80; G06F 3/0346; G06V 20/588; G06V 10/10; G06V 2201/06; G01C 25/00; G01C 21/1656; G01B 11/2522; G01B 11/026
See application file for complete search history.

(56) References Cited

U.S. PATENT DOCUMENTS

2022/0363499 A1* 11/2022 Abe .................. H01M 10/0404

FOREIGN PATENT DOCUMENTS

CN　　　109341529 A　*　2/2019　............. G01B 11/00
DE　　102020212641 A1 *　4/2022　............. B65G 54/02

* cited by examiner

*Primary Examiner* — Shervin K Nakhjavan
(74) *Attorney, Agent, or Firm* — Wiersch Law Group

(57) ABSTRACT

The present invention provides a method and device for calibrating a position of a mover in a direct drive transmission system. In response to receiving an arriving signal for a mover corresponding to a preset detection station, an image acquisition device disposed above the detection station is controlled to acquire an image of the mover; feature recognition is performed on the image of the mover, and an actual coordinate position of a preset feature image area is acquired in the image of the mover; a mover-arriving detection result is generated based on the actual coordinate position; and a calibration signal for the position of the mover is generated based on the mover-arriving detection result.

7 Claims, 6 Drawing Sheets

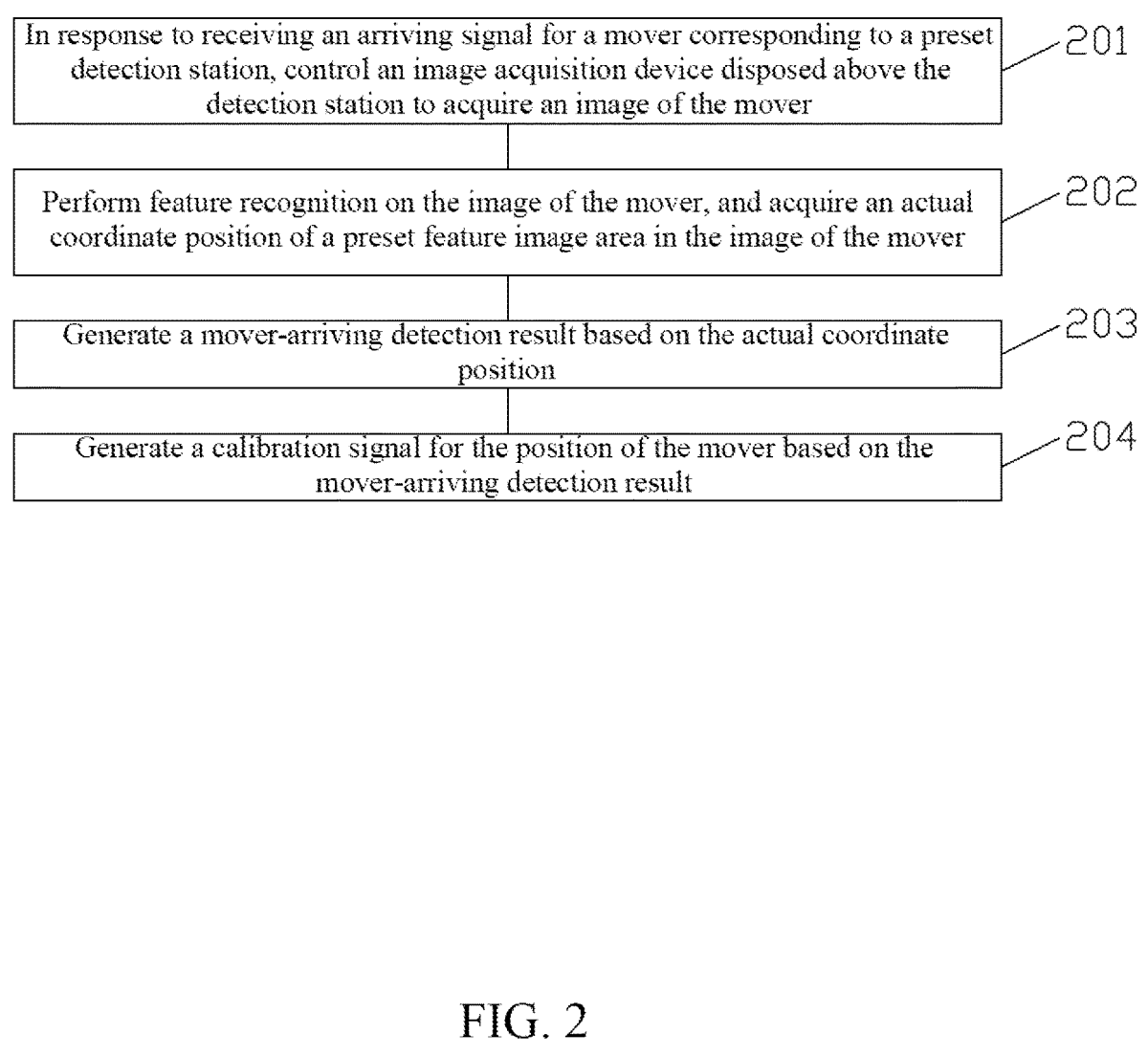

In response to receiving an arriving signal for a mover corresponding to a preset detection station, control an image acquisition device disposed above the detection station to acquire an image of the mover — 201

Perform feature recognition on the image of the mover, and acquire an actual coordinate position of a preset feature image area in the image of the mover — 202

Generate a mover-arriving detection result based on the actual coordinate position — 203

Generate a calibration signal for the position of the mover based on the mover-arriving detection result — 204

FIG. 2

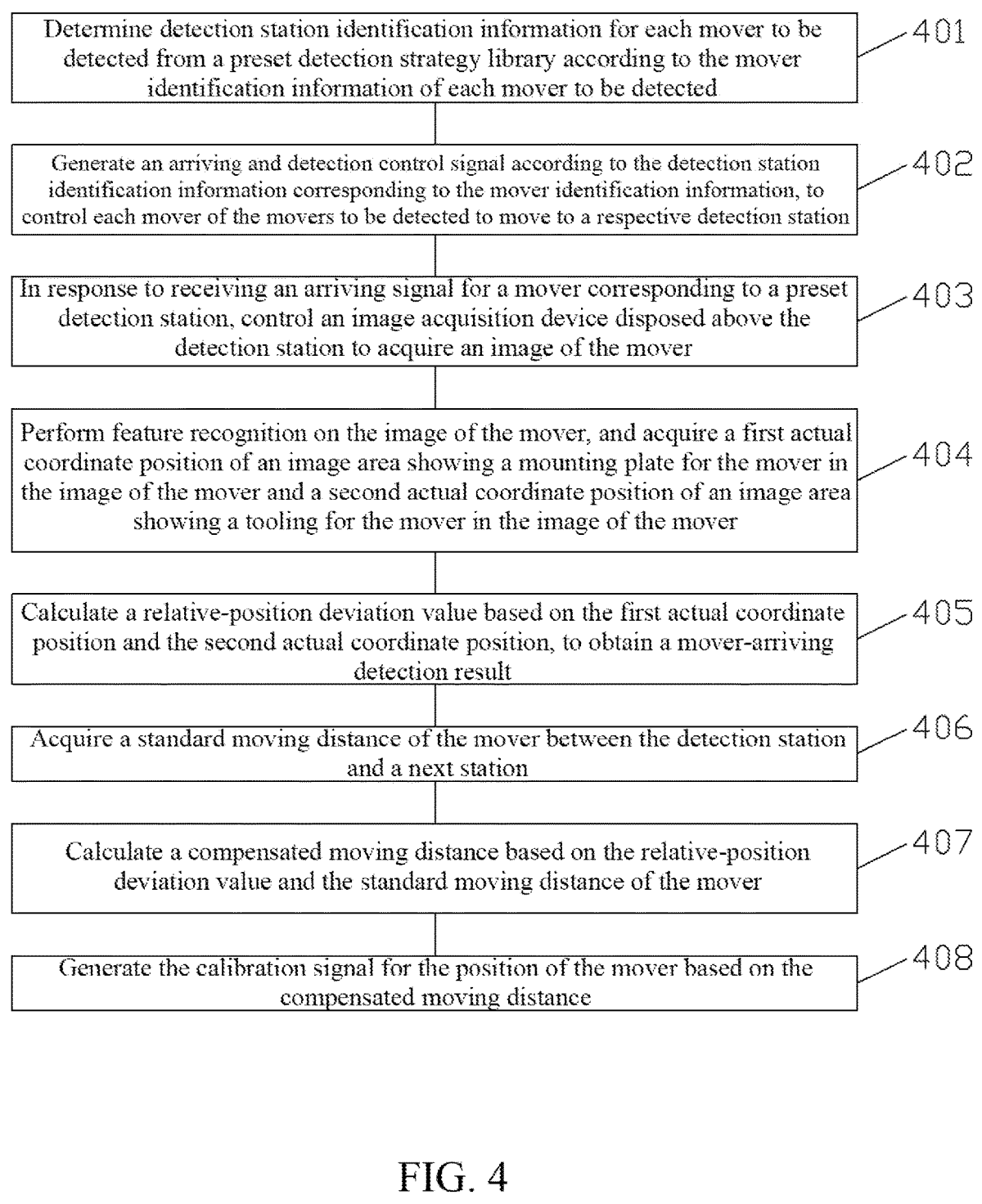

Determine detection station identification information for each mover to be detected from a preset detection strategy library according to the mover identification information of each mover to be detected ⟋401

Generate an arriving and detection control signal according to the detection station identification information corresponding to the mover identification information, to control each mover of the movers to be detected to move to a respective detection station ⟋402

In response to receiving an arriving signal for a mover corresponding to a preset detection station, control an image acquisition device disposed above the detection station to acquire an image of the mover ⟋403

Perform feature recognition on the image of the mover, and acquire a first actual coordinate position of an image area showing a mounting plate for the mover in the image of the mover and a second actual coordinate position of an image area showing a tooling for the mover in the image of the mover ⟋404

Calculate a relative-position deviation value based on the first actual coordinate position and the second actual coordinate position, to obtain a mover-arriving detection result ⟋405

Acquire a standard moving distance of the mover between the detection station and a next station ⟋406

Calculate a compensated moving distance based on the relative-position deviation value and the standard moving distance of the mover ⟋407

Generate the calibration signal for the position of the mover based on the compensated moving distance ⟋408

FIG. 4

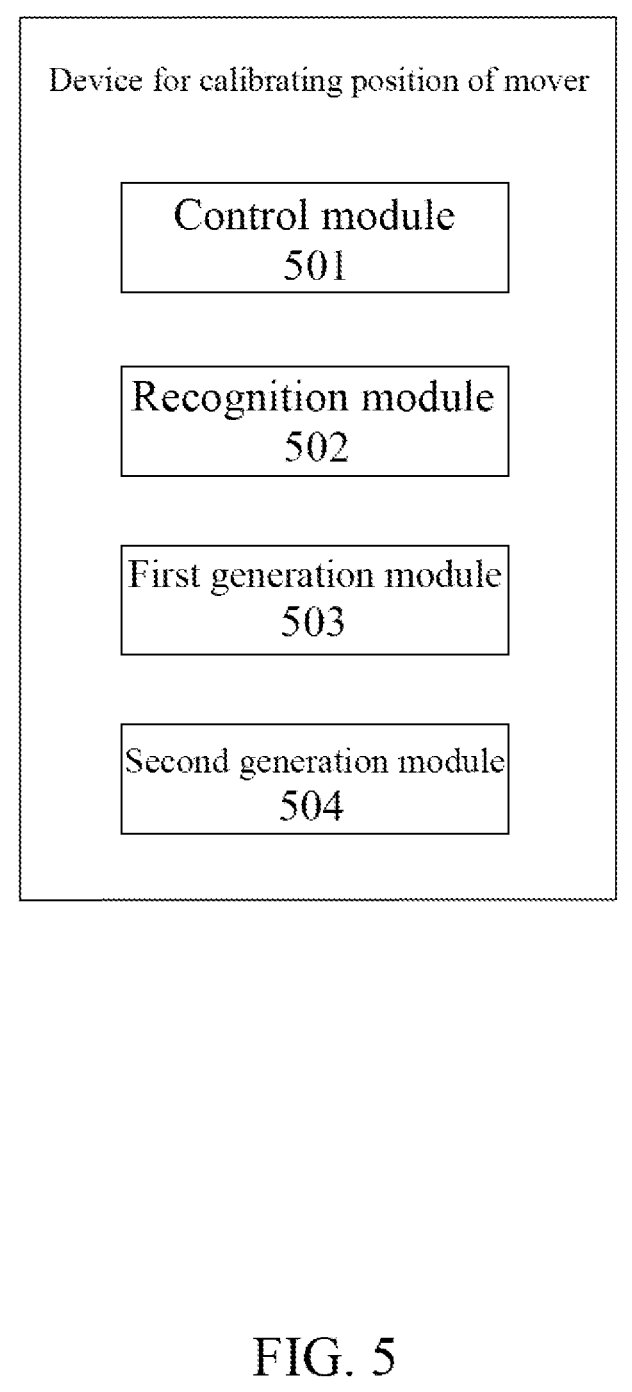

Device for calibrating position of mover

Control module
501

Recognition module
502

First generation module
503

Second generation module
504

FIG. 5

METHOD AND DEVICE FOR CALIBRATING POSITION OF MOVER IN DIRECT DRIVE TRANSMISSION SYSTEM

TECHNICAL FIELD

The present invention relates to the field of direct drive transmission technology, and in particular to a method and a device for calibrating position of a mover in a direct drive transmission system.

BACKGROUND

With the rapid development of technology, various types of linear transporting equipment are widely used in the production and manufacturing industry. The direct drive transmission system is a typical linear transporting equipment that uses a transmission system based on a direct drive motor to accurately control the movement of each transmission unit.

At present, a direct drive transmission system has a plurality of movers, and some assembly errors usually present between functional units of a mover, which may lead to position errors during the movement of the mover. Therefore, it is necessary to calibrate the positions of movers in the direct drive transmission system. In related technologies, contact based calibration of the positions of movers is usually used, which means using a dial indicator to detect and calibrate the position of each mover at a fixed position. However, when the direct drive transmission system has a large number of movers, it is usually necessary to frequently move the dial indicator, which cannot ensure calibration accuracy, and the operation is cumbersome and inefficient.

SUMMARY

Embodiments of the present invention provide a method and a device for calibrating position of a mover in a direct drive transmission system, which can at least address the technical problem in the related technologies that contact based calibration of the positions of movers in the direct drive transmission system cannot ensure calibration accuracy, and leads to cumbersome and inefficient operations.

To this end, some embodiments of the present invention provide a method for calibrating a position of a mover in a direct drive transmission system, including: in response to receiving an arriving signal for a mover corresponding to a preset detection station, controlling an image acquisition device disposed above the detection station to acquire an image of the mover; performing feature recognition on the image of the mover, and acquiring an actual coordinate position of a preset feature image area in the image of the mover; generating a mover-arriving detection result based on the actual coordinate position; and generating a calibration signal for the position of the mover based on the mover-arriving detection result.

Some embodiments of the present invention provide a device for calibrating a position of a mover in a direct drive transmission system, including: a control module, configured to in response to receiving an arriving signal for a mover corresponding to a preset detection station, control an image acquisition device disposed above the detection station to acquire an image of the mover; a recognition module, configured to perform feature recognition on the image of the mover, and to acquire an actual coordinate position of a preset feature image area in the image of the mover; a first generation module, configured to generate a mover-arriving detection result based on the actual coordinate position; and a second generation module, configured to generate a calibration signal for the position of the mover based on the mover-arriving detection result.

Some embodiments of the present invention provide a calibration equipment, including: a memory; and a processor. The memory is configured to store computer programs, which, when executed by the processor, causes the process to implement operations of the method for calibrating position of the mover in the direct drive transmission system as illustrated above.

Some embodiments of the present invention provide a computer readable storage medium, configured to store computer programs, which, when executed by a processor, causes the process to implement operations of the method for calibrating the position of the mover in the direct drive transmission system as illustrated above.

For the method and device for calibrating the position of the mover in the direct drive transmission system according to embodiments of the present invention, in response to receiving an arriving signal for a mover corresponding to a preset detection station, an image acquisition device disposed above the detection station is controlled to acquire an image of the mover; feature recognition is performed on the image of the mover, and an actual coordinate position of a preset feature image area is acquired in the image of the mover; a mover-arriving detection result is generated based on the actual coordinate position; and a calibration signal for the position of the mover is generated based on the mover-arriving detection result. With the solution according to the present invention, the direct drive transmission system is equipped with a non-contact visual detection station, and arriving detection and position calibration for the mover are performed with the aid of image processing. In this way, operation complexity can be reduced, calibration efficiency can be improved, and reliability of calibration results can be increased.

BRIEF DESCRIPTION OF DRAWINGS

FIG. 2 is a basic flowchart of a method for calibrating a position of a mover in the direct drive transmission system according to some embodiments of the present invention.

FIG. 4 is a specific flowchart of the method for calibrating the position of the mover in the direct drive transmission system according to some embodiments of the present invention.

FIG. 5 is a schematic diagram of modules of a device for calibrating a position of a mover in a direct drive transmission system according to some embodiments of the present invention.

DETAILED DESCRIPTION OF EMBODIMENTS

In order to make the purposes, features, and advantages of the present invention more obvious and understandable, the following will provide, in conjunction with the accompanying drawings, a clear and complete description of the technical solution according to the embodiments of the present invention. Obviously, the illustrated embodiments are only a part of the embodiments of the present invention, not all of them. Based on the embodiments of the present invention, all other embodiments obtained by those skilled in the art without creative work fall within the scope of protection of the present invention.

It is noted that in the description of the embodiments of the present invention, the terms "first" and "second" are only used for descriptive purposes and should not be understood as indicating or implying relative importance or implying the number of indicated technical features. Therefore, features limited by "first" and "second" may explicitly or implicitly include one or more these features. In the description of the embodiments of the present invention, the meaning of "a plurality of" refers to two or more, unless otherwise specified.

Figure 1:
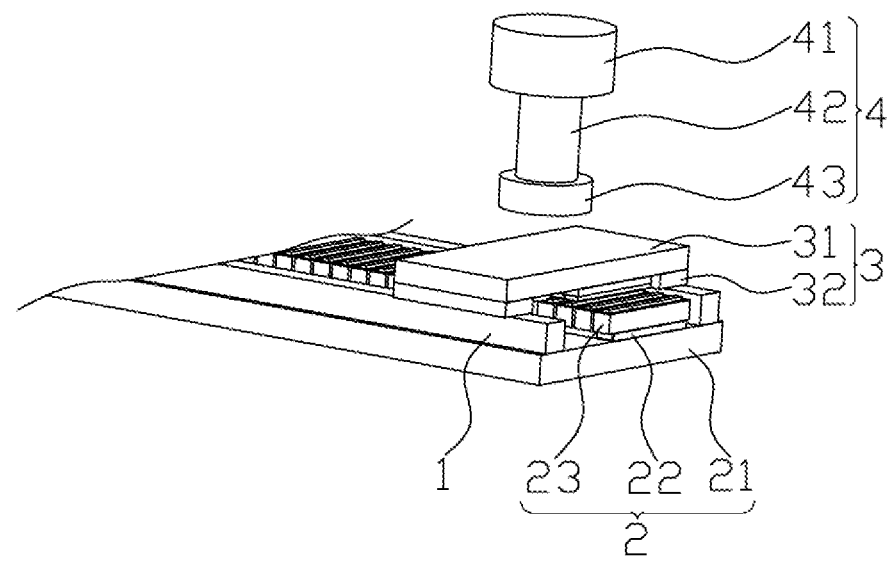
FIG. 1 is a schematic diagram of partial structure of a direct drive transmission system according to some embodiments of the present invention.

In order to address the technical problem in the related technologies that contact based calibration of the positions of movers in the direct drive transmission system cannot ensure calibration accuracy, and leads to cumbersome and inefficient operations, some embodiments of the present invention provide a method for calibrating a position of a mover in a direct drive transmission system, applicable to a direct drive transmission system having a plurality of movers. The direct drive transmission system may be a linear direct drive transmission system or a circular direct drive transmission system. FIG. 1 is a schematic diagram of partial structure of a direct drive transmission system according to some embodiments of the present invention, and illustration is based on a cooperation structure of a stator and a mover in the direct drive transmission system. The direct drive transmission system includes: guide rails 1, a stator 2, and a mover 3 slidably fitted to the guide rails 1. The mover 3 includes a mounting plate 31 for the mover and a plurality of magnetic steels 32 fixed to the mounting plate 31 for the mover. The stator 2 includes a stator mounting plate 21, a magnet 22 and a plurality of windings 23 fixed to the magnet 22. Each winding 23 includes a plurality of coils wound on the magnet 22. In practice, each stator 2 of the direct drive transmission system is electrically connected to a driver, and the driver is electrically connected to a controller. When the controller controls the driver to output current to the stator 2, the windings 23 of the energized stator 2 generates a traveling-wave magnetic field, which exerts a thrust on the magnetic steels 32 of the mover 3, causing the mover 3 to move along the guide rails 1 and in a direction of the thrust.

Referring to FIG. 1, the direct drive transmission system is provided with a non-contact visual system 4 which may be fixed to a specific platform of the direct drive transmission system through a bracket. The non-contact visual system 4 may be positioned directly above the mounting plate 31 for the mover and may be electrically connected to the controller of the direct drive transmission system. In some embodiments, the visual system 4 includes an image acquisition device 41, a lens 42, and a light source 43. The image acquisition device 41 may be a high-speed camera, for example.

FIG. 2 is a basic flowchart of a method for calibrating a position of a mover in the direct drive transmission system according to some embodiments of the present invention. The method includes the following operations.

At 201, in response to receiving an arriving signal for a mover corresponding to a preset detection station, an image acquisition device disposed above the detection station is controlled to acquire an image of the mover.

In some embodiments, there are at least one detection station used for calibrating the position of the mover in the direct drive transmission system, and the system determines that the mover has moved to the detection station by sensing the arriving signal for the mover. In this case, the image acquisition device disposed above the detection station is controlled to acquire an image of the mover which has moved to the detection station.

In some embodiments, there are a plurality of detection stations. Accordingly, before in response to receiving the arriving signal for the mover corresponding to the preset detection station, controlling the image acquisition device disposed above the detection station to acquire the image of the mover, the method further includes: mover identification information of each mover of movers to be detected is acquired; detection station identification information for each mover to be detected is determined from a preset detection strategy library according to the mover identification information; and an arriving and detection control signal is generated according to the detection station identification information corresponding to the mover identification information. Here the arriving and detection control signal is configured to control each mover of the movers to be detected to move to a respective detection station.

In practice, when all calibrations of positions of the movers are performed at a single detection station, it is necessary to use serial mode for the image acquisition and processing of each mover, and the calibrations may take a long time. Moreover, the functional properties of different movers in the direct drive transmission system may vary, resulting in differences in the physical structures of different movers. Therefore, one image acquisition device may not be able to balance the visual detection tasks of different movers. In view of this, the direct drive transmission system is provided with a plurality of detection stations, on the one hand, various forms of image acquisition devices may be equipped to adapt to movers having different functional properties, on the other hand, calibrations of positions of a plurality of movers may be performed concurrently.

In some embodiments, a detection strategy library including mapping relationships between representation information of different movers and identification information of detection stations is preset in the system. In this way, identification information of a corresponding detection station can be predetermined for each mover. During calibrations of positions of the movers, the controller controls each mover to move to a respective detection station based on the determined identification information of detection stations. Upon a mover arrives, the arriving signal for the mover is reported, and then triggers the above operation 201 to start the calibration process of position of the currently detected mover.

At 202, feature recognition on the image of the mover is performed, and an actual coordinate position of a preset feature image area in the image of the mover is acquired.

Each mover has a specific physical feature property that can be used to indicate the assembly accuracy of the mover. In some embodiments, a physical feature property may refer to a mark on a surface of the mounting plate for the mover, a fitting position of a tooling fitted to the mounting plate for the mover, a relative position between the mounting plate for the mover and the tooling or the like. Depending on the requirement of calibrations of positions of the movers, image feature recognition may be performed based on a specific physical feature property which is selected, to acquire the coordinate position of the feature image area in the image of the mover.

In some embodiments, before controlling the image acquisition device disposed above the detection station to acquire the image of the mover, the method further includes: a light source disposed above the detection station is controlled to enter a working state.

In practice, the quality (such as clarity, brightness, etc.) of the images acquired by the image acquisition device has a substantial influence on the results of image recognition and processing. In order to ensure that the image can provide as much detail information as possible, the light source may be triggered to illuminate the mover after it arrives the detection station, thereby ensuring the brightness of the environment where the mover is located, and improving the quality of the image of the mover acquired by the image acquisition device.

In some embodiments, before performing feature recognition on the image of the mover, the method further includes: mover identification information of the mover is acquired; and a to-be-recognized feature type is determined from a preset feature recognition strategy library according to the mover identification information. Accordingly, performing feature recognition on the image of the mover, includes: feature recognition is performed on the image of the mover according to the to-be-recognized feature type.

In practice, different movers may have different requirements on calibrations of positions, then different image features may be required for the calibrations of positions. Thus, to-be-recognized feature types corresponding to different movers are called from the preset feature recognition strategy library according to the mover identification information. Then during image recognition, corresponding feature recognition strategies are selected, according to the to-be-recognized feature types, to perform feature recognition on the currently detected mover. In this way, the effectiveness of feature recognition can be ensured, and the accuracy of calibration results can be improved.

At 203, a mover-arriving detection result is generated based on the actual coordinate position.

When the mover arrives, position information of the mover is determined based on the coordinate position of a typical image feature of the currently detected mover, to obtain the mover-arriving detection result.

In some embodiments, the feature image area refers to an image area showing a mark on a surface of the mover or an image area showing a tooling for the mover. Accordingly, generating the mover-arriving detection result based on the actual coordinate position, includes: a position deviation value between the actual coordinate position and a reference coordinate position is calculated, to obtain the mover-arriving detection result.

In practice, during movement of the mover on the transmission line, each work station to be arrived has standard position information. When the mover ideally accurately moves to a standard position, a theoretical coordinate position of the specific physical feature of the mover in the image should coincide with the preset reference coordinate position. However, if there is an assembly error in the mover, a relative position deviation would occur between the mover and the detection station. Therefore, in actual calibration scenarios, after identifying the actual coordinate position of the feature image area in the image of the mover, the actual coordinate position is compared with the reference coordinate position to obtain the position deviation value between them. The position deviation value is used as the mover-arriving detection result.

In some embodiments, acquiring the actual coordinate position of the preset feature image area in the image of the mover, includes: a first actual coordinate position of an image area showing a mounting plate for the mover in the image of the mover is acquired, and a second actual coordinate position of an image area showing a tooling for the mover in the image of the mover is acquired. Accordingly, generating the mover-arriving detection result based on the actual coordinate position, includes: a relative-position deviation value is calculated based on the first actual coordinate position and the second actual coordinate position, to obtain the mover-arriving detection result.

Figure 3:
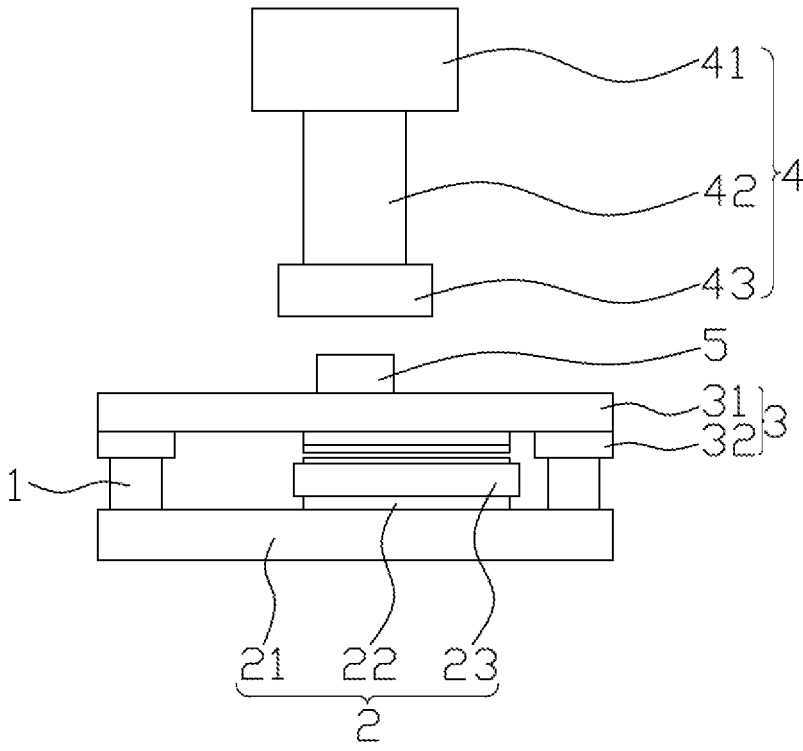
FIG. 3 is a schematic diagram of partial structure of another direct drive transmission system according to some embodiments of the present invention.

FIG. 3 is a schematic diagram of partial structure of another direct drive transmission system according to some embodiments of the present invention. A tooling 5 for the mover is fixed on the mounting plate 31 for the mover of the direct drive transmission system. The tooling may include, but not limited to fixtures, cutting tools, grinding tools, measuring tools, or the like. The visual system 4 is disposed directly above the mounting plate 31 for the mover, and includes an image acquisition device 41, a lens 42, and a light source 43.

Considering that the assembly error on the mover may occurs in the fitting process to the tooling for the mover, during image recognition, feature recognition may be performed on the tooling for the mover and the mounting plate for the mover, respectively, to obtain feature image areas of the tooling and the mounting plate. Then a respective feature point is acquired from each of the two feature image areas, and a difference between coordinate positions of the two feature points is calculated. Finally, the difference is used as the relative-position deviation value between the mounting plate for the mover and the tooling for the mover which is fixed on the mounting plate, thereby implementing the mover-arriving detection.

At 204, a calibration signal for the position of the mover is generated based on the mover-arriving detection result.

By performing position testing on the mover which moves to the detection station, the relative position deviation between the mover and the detection station or between the mounting plate for the mover and the tooling for the mover is obtained. Then the calibration signal for the position of the mover is generated based on the position deviation and is reported to the controller. The controller may adaptively change, according to the calibration signal for the position of the mover, the movement of the mover by adjusting the working current for the stator, thereby changing a sliding distance of the mover on the guide rails. In this way, a movement error caused by inherent errors generated during the assembly process of different functional units of the mover can be corrected. It is noted that the calibration signal for the position of the mover may be used for the controller to adjust the working current for all stators or a part of stators.

In some embodiments, generating the calibration signal for the position of the mover based on the mover-arriving detection result, includes: a standard moving distance of the mover between the detection station and a next station is acquired; a compensated moving distance is calculated based on the relative-position deviation value and the standard moving distance of the mover; and the calibration signal for the position of the mover is generated based on the compensated moving distance.

The calibration signal for the position of the mover is configured to control the mover being detected to move from the detection station to the next station. The movement of each mover between stations corresponds to a standard moving distance. After the position assembly deviation between the mounting plate for the mover and the tooling is obtained by calculation, the position assembly deviation is compensated to the moving distance of the mover from the detection station to the next station, and the mover is controlled to move to the next station using the compensated moving distance. In this way, the movement error caused by assembly error with the tooling can be corrected.

Compared with the related technologies, with the method for calibrating the position of the mover in the direct drive transmission system according to embodiments of the present invention, in response to receiving an arriving signal for a mover corresponding to a preset detection station, an image acquisition device disposed above the detection station is controlled to acquire an image of the mover; feature recognition is performed on the image of the mover, and an actual coordinate position of a preset feature image area is acquired in the image of the mover; a mover-arriving detection result is generated based on the actual coordinate position; and a calibration signal for the position of the mover is generated based on the mover-arriving detection result. With the solution according to the present invention, the direct drive transmission system is equipped with a non-contact visual detection station, and arriving detection and position calibration for the mover are performed with the aid of image processing. In this way, operation complexity can be reduced, calibration efficiency can be improved, and reliability of calibration results can be increased.

In order to better understand the present invention, embodiments of the present invention further provide a detailed method for calibrating the position of the mover in the direct drive transmission system. FIG. 4 is a specific flowchart of the detailed method for calibrating the position of the mover in the direct drive transmission system according to some embodiments of the present invention. The method includes the following operations.

At 401, detection station identification information for each mover to be detected is determined from a preset detection strategy library according to the mover identification information of each mover to be detected.

The mover identification is configured to uniquely identify the identities of the plurality of movers in the direct drive transmission system.

At 402, an arriving and detection control signal is generated according to the detection station identification information corresponding to the mover identification information, to control each mover of the movers to be detected to move to a respective detection station.

Movers of different types have different position calibration requirements. Thus, a plurality of detection stations are provided to perform position calibrations. In this way, calibration efficiency and accuracy of calibration results in diverse calibration scenarios can be improved.

At 403, in response to receiving an arriving signal for a mover corresponding to a preset detection station, an image acquisition device disposed above the detection station is controlled to acquire an image of the mover.

The light source disposed above the detection station may be controlled to emit light to the mover, to ensure the environmental brightness during the image acquisition, thereby improving the quality of the acquired image of the mover.

At 404, feature recognition is performed on the image of the mover, and a first actual coordinate position of an image area showing a mounting plate for the mover in the image of the mover and a second actual coordinate position of an image area showing a tooling for the mover in the image of the mover are acquired.

At 405, a relative-position deviation value is calculated based on the first actual coordinate position and the second actual coordinate position, to obtain a mover-arriving detection result.

The tooling is mounted on the mounting plate for the mover, and there may be some assembly errors between the tooling and the mounting plate during assembly. The assembly errors between the tooling and the mounting plate are determined by calculating the relative-position deviation value between the tooling and the mounting plate.

At 406, a standard moving distance of the mover between the detection station and a next station is acquired.

At 407, a compensated moving distance is calculated based on the relative-position deviation value and the standard moving distance of the mover.

The position assembly deviation between the tooling and the mounting plate for the mover is compensated to the moving distance of the mover from the detection station to the next station, and the mover is controlled to move to the next station using the compensated moving distance. In this way, the movement error caused by assembly error with the tooling can be corrected.

At 408, the calibration signal for the position of the mover is generated based on the compensated moving distance.

The calibration signal for the position of the mover is used to adaptively change the movement of the mover to the next station by adjusting the working current for the stator, thereby changing a movement distance of the mover to the next station on the guide rails. In this way, the movement error caused by assembly error with the tooling can be corrected.

It is noted that the non-contact visual calibration solution is used to identify the image features of each mover, and an actual arriving position of each mover is calculated using image processing, thereby calculating the position deviation of each mover, and implementing calibration of position of each mover. The visual system is fixed throughout the calibration process. In this way, operations are simple and calibration results are reliable.

It should be understood that the sequence numbers of the above operations do not necessarily mean the order in which the operations are executed. The execution order of the operations should be determined based on function and internal logic of the operations, and should not constitute a unique limitation on the implementation process of the embodiments of the present invention.

FIG. 5 shows a device for calibrating a position of a mover in a direct drive transmission system according to some embodiments of the present invention. The device may be used to implement the methods for calibrating the position of the mover in the direct drive transmission system as illustrated above. As shown in FIG. 5, the device includes:

a control module 501, configured to in response to receiving an arriving signal for a mover corresponding to a preset detection station, control an image acquisition device disposed above the detection station to acquire an image of the mover;

a recognition module 502, configured to perform feature recognition on the image of the mover, and to acquire an actual coordinate position of a preset feature image area in the image of the mover;

a first generation module 503, configured to generate a mover-arriving detection result based on the actual coordinate position; and a second generation module 504, configured to generate a calibration signal for the position of the mover based on the mover-arriving detection result.

In some embodiments, the control module is further configured to control a light source disposed above the detection station to enter a working state.

In some embodiments, the feature image area refers to an image area showing a mark on a surface of the mover or an image area showing a tooling for the mover. Accordingly, the first generation module is further configured to calculate a position deviation value between the actual coordinate position and a reference coordinate position, to obtain the mover-arriving detection result.

In some embodiments, when acquiring the actual coordinate position of the preset feature image area in the image of the mover, the recognition module is specifically configured to: acquire a first actual coordinate position of an image area showing a mounting plate for the mover in the image of the mover, and acquire a second actual coordinate position of an image area showing a tooling for the mover in the image of the mover. Accordingly, the first generation module is specifically configured to calculate a relative-position deviation value based on the first actual coordinate position and the second actual coordinate position, to obtain the mover-arriving detection result.

In some embodiments, the second generation module is specifically configured to: acquire a standard moving distance of the mover between the detection station and a next station; calculate a compensated moving distance based on the relative-position deviation value and the standard moving distance of the mover; and generate the calibration signal for the position of the mover based on the compensated moving distance. Herein the calibration signal for the position of the mover is configured to control the mover being detected to move from the detection station to the next station.

In some embodiments, the device for calibrating the position of the mover further includes: an acquisition module, a determination module and a third generation module. The acquisition module is configured to acquire mover identification information of each mover of movers to be detected, the determination module is configured to determine, according to the mover identification information, detection station identification information for each mover to be detected from a preset detection strategy library, and the third generation module is configured to generate an arriving and detection control signal according to the detection station identification information corresponding to the mover identification information. Herein the arriving and detection control signal is configured to control each mover of the movers to be detected to move to a respective detection station.

In some embodiments, the acquisition module is further configured to acquire mover identification information of the mover, and the determination module is further configured to determine a to-be-recognized feature type from a preset feature recognition strategy library according to the mover identification information. When performing feature recognition on the image of the mover, the recognition module is specifically configured to perform feature recognition on the image of the mover according to the to-be-recognized feature type.

It is noted that the device provided in above embodiments may be used to implement the methods for calibrating the position of the mover in the direct drive transmission system as illustrated above. Those skilled in the art should understand that for the convenience and conciseness of the description, the specific working process of the device for calibrating the position of the mover in the direct drive transmission system as described above may refer to the corresponding process in the aforementioned method embodiments, and will not be repeated here.

Compared with the related technologies, with the device for calibrating the position of the mover in the direct drive transmission system according to embodiments of the present invention, in response to receiving an arriving signal for a mover corresponding to a preset detection station, an image acquisition device disposed above the detection station is controlled to acquire an image of the mover; feature recognition is performed on the image of the mover, and an actual coordinate position of a preset feature image area is acquired in the image of the mover; a mover-arriving detection result is generated based on the actual coordinate position; and a calibration signal for the position of the mover is generated based on the mover-arriving detection result. With the solution according to the present invention, the direct drive transmission system is equipped with a non-contact visual detection station, and arriving detection and position calibration for the mover are performed with the aid of image processing. In this way, operation complexity can be reduced, calibration efficiency can be improved, and reliability of calibration results can be increased.

Figure 6:
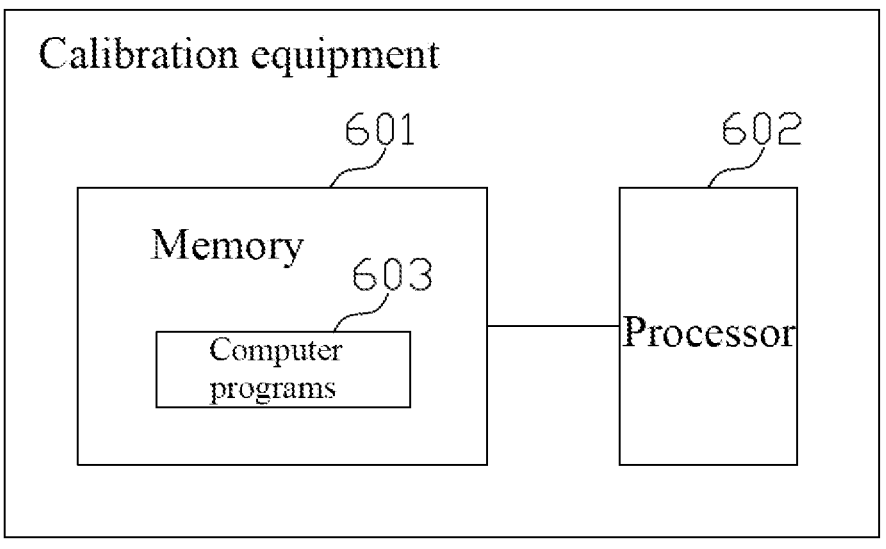
FIG. 6 is a schematic diagram of hardware structure of a calibration equipment according to some embodiments of the present invention.

Referring to FIG. 6, FIG. 6 shows a calibration equipment. The calibration equipment may be used to implement the methods for calibrating the position of the mover in the direct drive transmission system as illustrated in the above embodiments. As shown in FIG. 6, the calibration equipment includes a memory 601 and a processor 602 electrically connected with the memory 601. The memory 601 is configured to store computer programs 603, which, when executed by the processor 602, causes the process 602 to implement operations of the methods for calibrating the position of the mover in the direct drive transmission system as illustrated in the above embodiments. There may be one or more processors.

The memory 601 may be a high-speed random access memory (RAM) or a non-volatile memory, such as a disk. The memory 601 is configured to store executable program code, and the processor 602 is coupled with the memory 601.

Embodiments of the present invention further provide a computer readable storage medium. The computer readable storage medium may be disposed in the calibration equipment as illustrated in the above embodiments. The computer readable storage medium may be the memory in the embodiments as shown in FIG. 6.

The computer readable storage medium is configured to store computer programs 603, which, when executed by the processor 602, causes the process to implement operations of the methods for calibrating the position of the mover in the direct drive transmission system as illustrated in the above embodiments. The computer readable storage medium also may be various media that can store program codes, such as USB flash drives, mobile hard drives, Read-Only Memory (ROM), RAM, disks, optical discs, or the like.

It should be understood that the disclosed devices and methods in embodiments of the present invention may be implemented in other ways. For example, the device embodiments as described above are only schematic. For example, the division of modules is only a logical functional division, and there may be other division methods in actual implementation, such as several modules or components may be combined or be integrated into another system, or some features may be ignored or not executed. On the other hand, the presented or discussed coupling or direct coupling or communication connection between each other may be indirect coupling or communication connection through some interfaces, devices or modules, which may be electrical, mechanical or other forms.

The modules described as separate components may be or may not be physically separated, and the components presented as modules may be or may not be physical modules, which may be located in one position or distributed across multiple network modules. Some or all modules may be selected according to actual needs to achieve the purpose of embodiments of the present invention.

In addition, in the embodiments of the present invention, each functional module may be integrated into a single processing module, or may be physically separate modules, or two or more modules may be integrated into one module. The integrated modules mentioned above may be implemented as hardware or software functional modules.

When an integrated module is implemented in the form of a software functional module and sold or used as an individual product, it may be stored on a computer readable storage medium. Based on this understanding, the technical solution of the present invention, in essence, or the portion that contributes to the existing technology, or all or part of the technical solution, may be implemented in the form of a software product, which is stored in a readable storage medium and includes several instructions to enable a computer device (which may be a personal computer, server, or network device, etc.) to perform all or part of the operations of the methods provided in embodiments of the present invention. The aforementioned readable storage media include various media that can store program codes, such as USB flash drives, mobile hard drives, ROM, RAM, disks, optical discs, or the like.

It should be noted that for the convenience of description, each of the aforementioned method embodiments is illustrated as combinations of a series of operations. However, those skilled in the art should be aware that the present invention is not limited to the described operation sequence, because in the present invention, certain operations may be performed in other sequences or concurrently. Secondly, those skilled in the art should also be aware that the described embodiments are all preferred embodiments, and the operations and modules involved may not be necessary for the present invention.

In the above embodiments, the descriptions of each embodiment have their own emphasis. For the parts that are not detailed in an embodiment, reference may be made to the relevant descriptions in other embodiments.

The method and device for calibrating the position of the mover in the direct drive transmission system are illustrated above. For those skilled in the art, there may be changes in the specific implementations and application scope on the basis of the ideas of the embodiments of the present invention. In summary, the content of the specification should not be understood as a limitation of the present invention.

What is claimed is:

1. A method for calibrating a position of a mover in a direct drive transmission system, comprising:

in response to receiving an arriving signal for a mover corresponding to a preset detection station, controlling an image acquisition device disposed above the detection station for acquiring an image of the mover;

performing feature recognition on the image of the mover, and acquiring an actual coordinate position of a preset feature image area in the image of the mover;

generating a mover-arriving detection result based on the actual coordinate position; and generating a calibration signal for the position of the mover based on the mover-arriving detection result;

wherein there are a plurality of detection stations, and before in response to receiving the arriving signal for the mover corresponding to the preset detection station, controlling the image acquisition device disposed above the detection station to acquire the image of the mover, the method further comprises:

acquiring mover identification information of each mover of movers to be detected;

determining, according to the mover identification information, detection station identification information for each mover to be detected from a preset detection strategy library; and generating an arriving and detection control signal according to the detection station identification information corresponding to the mover identification information, wherein the arriving and detection control signal is configured to control each mover of the movers to be detected to move to a respective detection station.

2. The method according to claim 1, wherein before controlling the image acquisition device disposed above the detection station to acquire the image of the mover, the method further comprises:

controlling a light source disposed above the detection station to enter a working state.

3. The method according to claim 1, wherein the feature image area refers to an image area showing a mark on a surface of the mover or an image area showing a tooling for the mover, and generating the mover-arriving detection result based on the actual coordinate position, comprises:

calculating a position deviation value between the actual coordinate position and a reference coordinate position, to obtain the mover-arriving detection result.

4. The method according to claim 1, wherein acquiring the actual coordinate position of the preset feature image area in the image of the mover, comprises:

acquiring a first actual coordinate position of an image area showing a mounting plate for the mover in the image of the mover, and acquiring a second actual coordinate position of an image area showing a tooling for the mover in the image of the mover; and generating the mover-arriving detection result based on the actual coordinate position, comprises:

calculating a relative-position deviation value based on the first actual coordinate position and the second actual coordinate position, to obtain the mover-arriving detection result.

5. The method according to claim 4, wherein generating the calibration signal for the position of the mover based on the mover-arriving detection result, comprises:

acquiring a standard moving distance of the mover between the detection station and a next station;

calculating a compensated moving distance based on the relative-position deviation value and the standard moving distance of the mover; and generating the calibration signal for the position of the mover based on the compensated moving distance, wherein the calibration signal for the position of the mover is configured to control the mover being detected to move from the detection station to the next station.

6. The method according to claim 1, wherein before performing feature recognition on the image of the mover, the method further comprises:

acquiring mover identification information of the mover; and determining a to-be-recognized feature type from a preset feature recognition strategy library according to the mover identification information; and wherein performing feature recognition on the image of the mover, comprises:

performing feature recognition on the image of the mover according to the to-be-recognized feature type.

7. A calibration equipment, comprising:

a memory; and a processor;

wherein the memory is configured to store computer programs, which, when executed by the processor, causes the process to implement operations of a method for calibrating a position of a mover in a direct drive transmission system, wherein the method comprises:

in response to receiving an arriving signal for a mover corresponding to a preset detection station, controlling an image acquisition device disposed above the detection station for acquiring an image of the mover;

performing feature recognition on the image of the mover, and acquiring an actual coordinate position of a preset feature image area in the image of the mover;

generating a mover-arriving detection result based on the actual coordinate position; and generating a calibration signal for the position of the mover based on the mover-arriving detection result; wherein there are a plurality of detection stations, and before in response to receiving the arriving signal for the mover corresponding to the preset detection station, controlling the image acquisition device disposed above the detection station to acquire the image of the mover, the method further comprises:

acquiring mover identification information of each mover of movers to be detected;

determining, according to the mover identification information, detection station identification information for each mover to be detected from a preset detection strategy library; and generating an arriving and detection control signal according to the detection station identification information corresponding to the mover identification information, wherein the arriving and detection control signal is configured to control each mover of the movers to be detected to move to a respective detection station.

* * * * *